United States Patent
Nagarajan et al.

(10) Patent No.: US 10,379,782 B2
(45) Date of Patent: Aug. 13, 2019

(54) HOST MANAGED SOLID STATE DRIVECACHING USING DYNAMIC WRITE ACCELERATION

(71) Applicant: Intel Corporation, Santa Clara, CA (US)

(72) Inventors: Suresh Nagarajan, Folsom, CA (US); Sriram Natarajan, Folsom, CA (US); Shankar Natarajan, Folsom, CA (US); Jason B. Akers, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 15/680,435

(22) Filed: Aug. 18, 2017

(65) Prior Publication Data

US 2019/0056886 A1    Feb. 21, 2019

(51) Int. Cl.
*G06F 3/06* (2006.01)
*G06F 12/0893* (2016.01)

(52) U.S. Cl.
CPC .......... *G06F 3/0659* (2013.01); *G06F 3/0604* (2013.01); *G06F 3/0656* (2013.01); *G06F 3/0679* (2013.01); *G06F 12/0893* (2013.01); *G06F 2212/1016* (2013.01); *G06F 2212/202* (2013.01)

(58) Field of Classification Search
CPC .... G06F 3/0656; G06F 3/0659; G06F 3/0679; G06F 12/0238; G06F 12/0246; G06F 2212/202; G06F 2212/222; G06F 2212/7203
USPC ......................................... 711/103, 117, 173
See application file for complete search history.

(56) References Cited

U.S. PATENT DOCUMENTS

| | | | | |
|---|---|---|---|---|
| 2009/0259799 A1* | 10/2009 | Wong | ................... | G06F 12/0207 711/103 |
| 2009/0327591 A1* | 12/2009 | Moshayedi | ......... | G06F 11/1441 711/103 |
| 2017/0075812 A1* | 3/2017 | Wu | ...................... | G06F 12/0893 |
| 2018/0081543 A1* | 3/2018 | Muchherla | ............ | G06F 3/0604 |

OTHER PUBLICATIONS

Marks, Kevin, "An NVM Express Tutorial", Flash Memory Summit 2013, 92 pages.
Intel, "System Memory at a Fraction of the DRAM Cost", Nov. 5, 2015, 5 pages.

(Continued)

*Primary Examiner* — Gary J Portka
(74) *Attorney, Agent, or Firm* — Jordan IP Law, LLC (57) ABSTRACT

Systems, apparatuses and methods may provide for technology that writes a block of data addressed within a host managed cache region into a set of multi-level non-volatile memory (NVM) cells organized into a dynamic single level cell buffer region, that writes a block of data addressed outside the host managed cache region into the set of multi-level NVM cells organized into a static single level cell buffer region, and automatically writes the contents of the static single level cell buffer region into the dynamic multi-level NVM media region. The host manage cache region comprises a set of dynamic single level NVM cells within the dynamic multi-level NVM media region, and the multi-level NVM cells are to be dynamically convertible into and from single NVM cells.

24 Claims, 6 Drawing Sheets

(56) References Cited

OTHER PUBLICATIONS

"Technical Note: NVMe Basic Management Command", NVM Express, Inc., Feb. 24, 2015, 5 pages.
"NVM Express Moves into the Future", NVM Express, Inc., downloaded from nvmexpress.org on Jun. 30, 2017, 7 pages.
"Introduction", NVM Express, Inc., downloaded from nvmexpress.org on Jun. 30, 2017, 5 pages.
"NVM Express" NVM Express, Inc., Oct. 11, 2012, 163 pages.
"Maximizing Oracle Database Performance with Intel SSD DC P3600 Series NVMe* SSDs on the Dell Poweredge", A Principled Technologies Report, Mar. 2016, 21 pages.

* cited by examiner

HOST MANAGED SOLID STATE DRIVECACHING USING DYNAMIC WRITE ACCELERATION

TECHNICAL FIELD

Embodiments generally relate to solid state drives.

BACKGROUND

A solid state drive (SSD) has nonvolatile memory which retains data stored in the nonvolatile memory notwithstanding a power loss to the storage drive. The non-volatile memory may be NAND-based flash memory.

A multi-level non-volatile memory stores more than one bit per cell. Multi-level NAND memory having four (4) possible voltage levels per cell, may represent two (2) bits of data per cell. NAND memory having eight (8) voltage levels per cell may be referred to as triple-level cell (TLC) memory and may represent three (3) bits of data per cell. NAND memory having sixteen (16) voltage levels per cell may be referred to as quad-level cell (QLC) memory and may represent four (4) bits of data per cell. Each of these memory types respond with differing read and write speeds which may affect performance for operations with a host computer.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Multi-level Cell (MLC), for example, TLC and QLC NAND in comparison to single level cell (SLC) NAND (e.g., "fast media"), is typically cheaper per bit to produce and available in higher storage capacities, but at the tradeoff of relatively shorter life spans and slower read/write speeds. An SSD may include both SLC NAND and MLC NAND. The MLC NAND may operate in SLC NAND mode by storing one bit per memory cell.

An SSD may include a static SLC NAND buffer to improve burst write performance for writing data to the SSD followed by writing the data to MLC (for example, TLC or QLC) NAND via direct writes to MLC NAND along with eviction of the data from the static SLC NAND buffer. Another approach for providing faster data access is called dynamic SLC wherein a portion of MLC NAND is used in SLC mode and then dynamically converted to MLC mode when additional user-capacity is needed. Neither of these techniques account for caching of most frequently accessed data (hot data) in fast media (for example, SLC NAND).

Non-Volatile Memory Express (NVMe) is a logical device interface (nvmexpress.org) for accessing non-volatile storage media attached via a Peripheral Component Interconnect Express (PCIe) bus (pcsig.com). The non-volatile storage media may comprise a flash memory and solid solid-state drives (SSDs). NVMe is designed for accessing low latency storage devices in computer systems, including personal and enterprise computer systems, and is also deployed in data centers requiring scaling of thousands of low latency storage devices. The NVMe interface to an SSD device may be contrasted with a Serial ATA (SATA) interface that is also used to provide an interface to SSD devices.

Figure 1A:
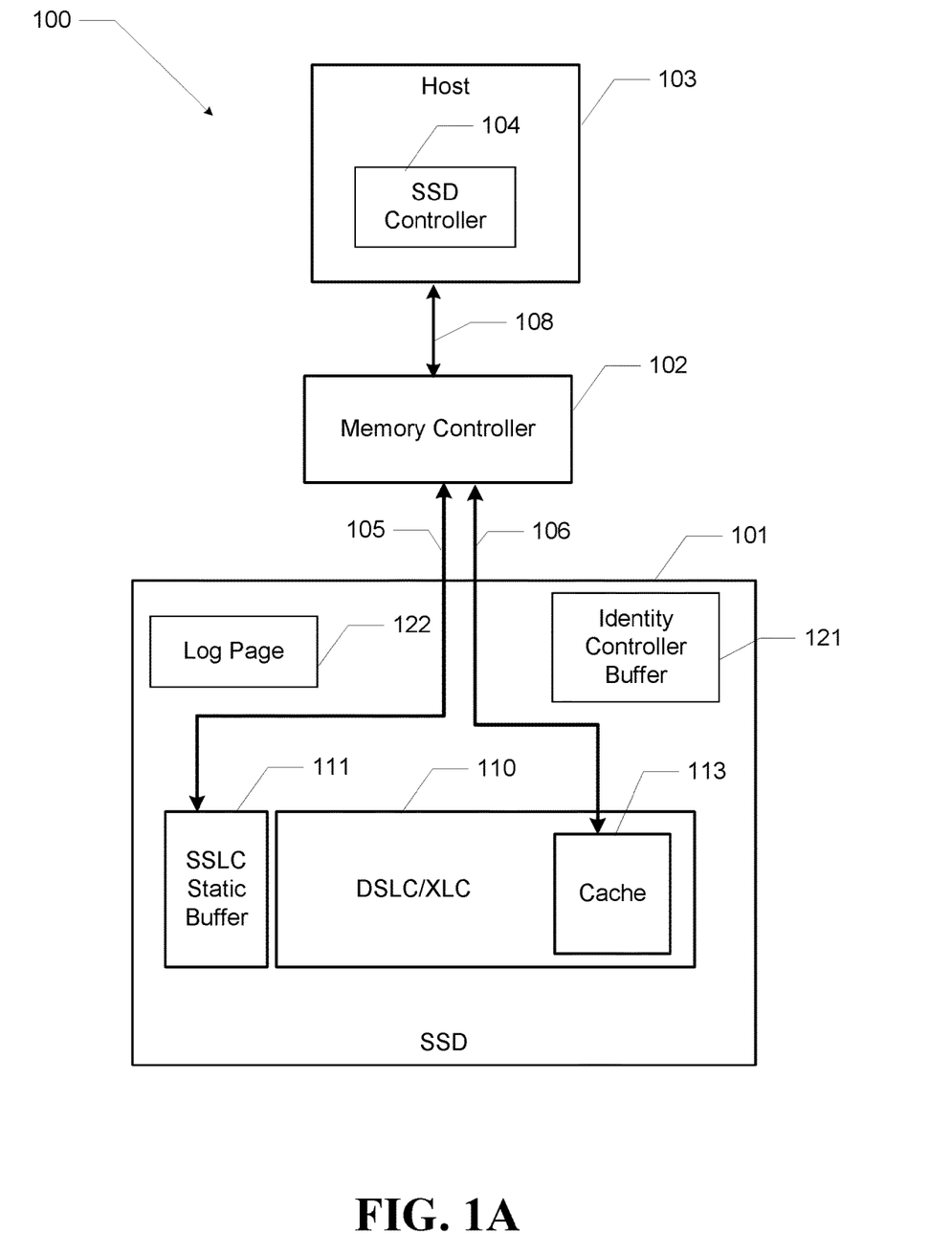
FIGS. 1A-1B are illustrations of an example host managed caches with dynamic write acceleration for an SSD architecture according to embodiments.

Turning now to FIG. 1A, a host managed SSD caching solution 100 provides an ability to read/write data 104 into/out of a fast media, for example, a SLC (DSLC) buffer region 113 in a SSD 101. In an embodiment the host 103 has a PCIe interface 108. NVMe commands are sent over the PCIe interface 108 to the SSD. The NVMe commands include a set of standard NVMe commands 105 and vendor unique NVMe commands 105, all of which are transmitted over the PCIe interface 108 to the SSD 101. This host based solution 100 may use dynamic write acceleration and a process within a memory controller 102 to expose a host managed cache (HMC) LBA (logical block address) region within the dynamic SLC (DSLC) buffer region 113. The host based solution 100 enables host 103 via a host driver 104 to optimize overall storage performance within the HMC region 113. The dynamic SLC (DSLC) buffer region 113 is logically similar to a non-volatile memory express (NVMe) namespace, with the addition of handshaking to account for dynamic SLC capacity restrictions. A namespace is a list of logical block addresses in an NMVe device that permits mapping of addresses of memory within the logical block to physical locations within the device. NVMe commands permit the SSD controller 102 to access locations within the logical block.

Enhanced versions of Read, Write, Write Zeroes, and Dataset Management commands may be defined as the only host software interface to the HMC region 113. In one embodiment the SSD 101 is connected to the memory controller 102 via a PCIe bus 108 using the NVMe interface. Five vendor specific versions of commands have been implemented as permitted in the definition of the NVMe interface. These vendor specific commands are communicated to the SSD via the NVMe interface as all other commands are communicated. Standard read/write commands will access memory.

Figure 2:
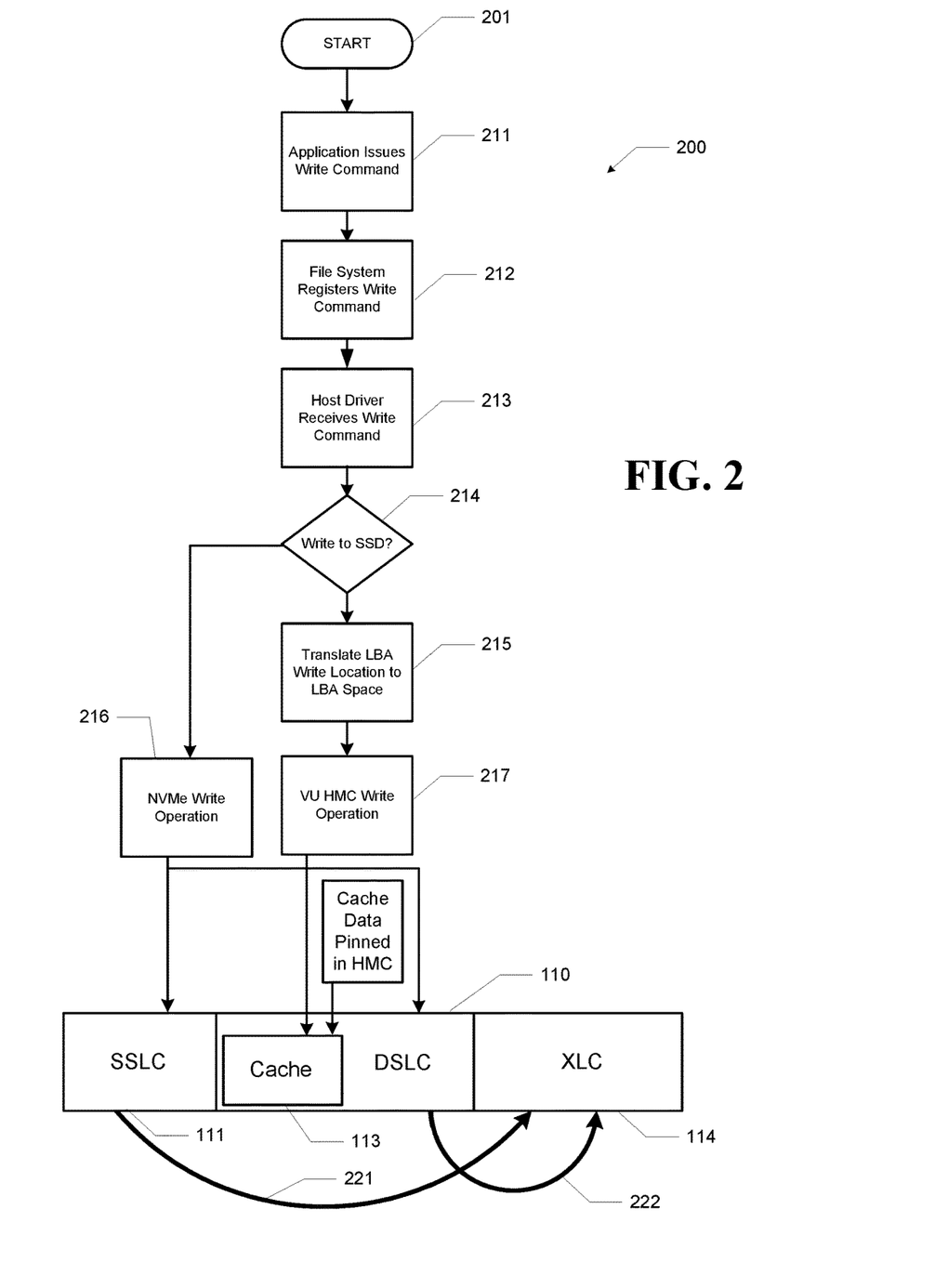
FIG. 2 is a flowchart of an example of a write operation according to an embodiment.
Figure 3:
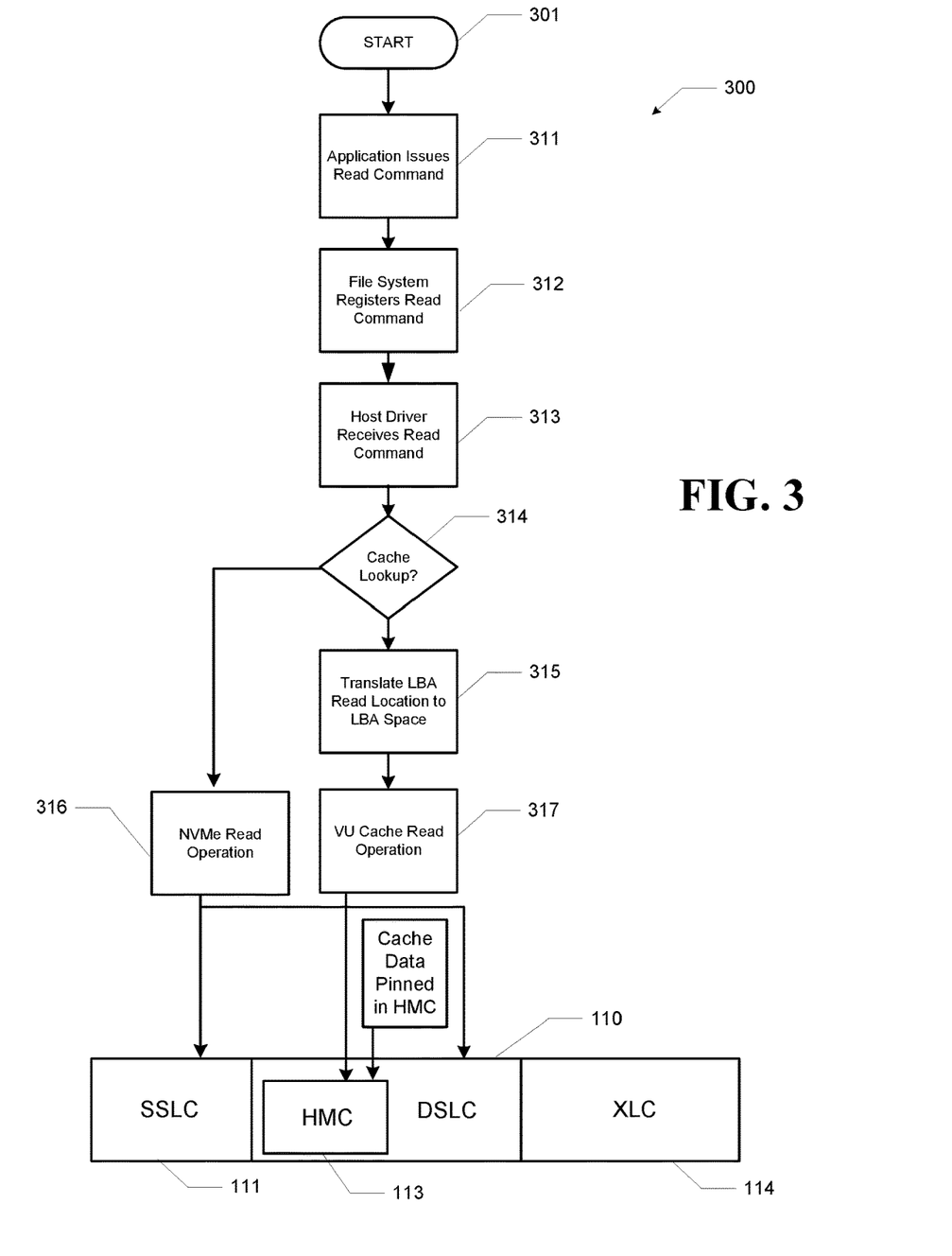
FIG. 3 is a flowchart of an example read operation according to an embodiment.

The added enhanced commands include: 1) Flush, 2) Write, 3) Read, 4) Write Zeroes, 5) Dataset Management. These five commands are all similar in function to corresponding Standardized NVMe commands from a memory controller 102 to an SSD 101, but these added commands specifically target use of the our HMC region 113. The enhanced Flush command instructs the SSD 101 to ensure that data that has been written to the HMC region 113 of the SSD 101 is made non-volatile. This command is primarily used to protect against power-loss scenarios. The enhanced Write command is used to write data to the HMC region 113 of the SSD 101 as illustrated in FIG. 2 below. The enhanced Read command is used to read data from the HMC region 113 of the SSD 101 as illustrated in FIG. 3 below. The enhanced Write Zeroes command is used to write a block of data consisting only of zeroes to the HMC region 113 of the SSD 101. The Dataset Management command is used to "unmap" or "TRIM" data within the HMC 113 region of the SSD 101, allowing for easier garbage collection and resource allocation within the SSD Firmware. This command may also be used to tune the performance of the HMC region 113 of the SSD 101 or provide other information to the SSD 101 as defined in the NVMe Specification.

Figure 5:
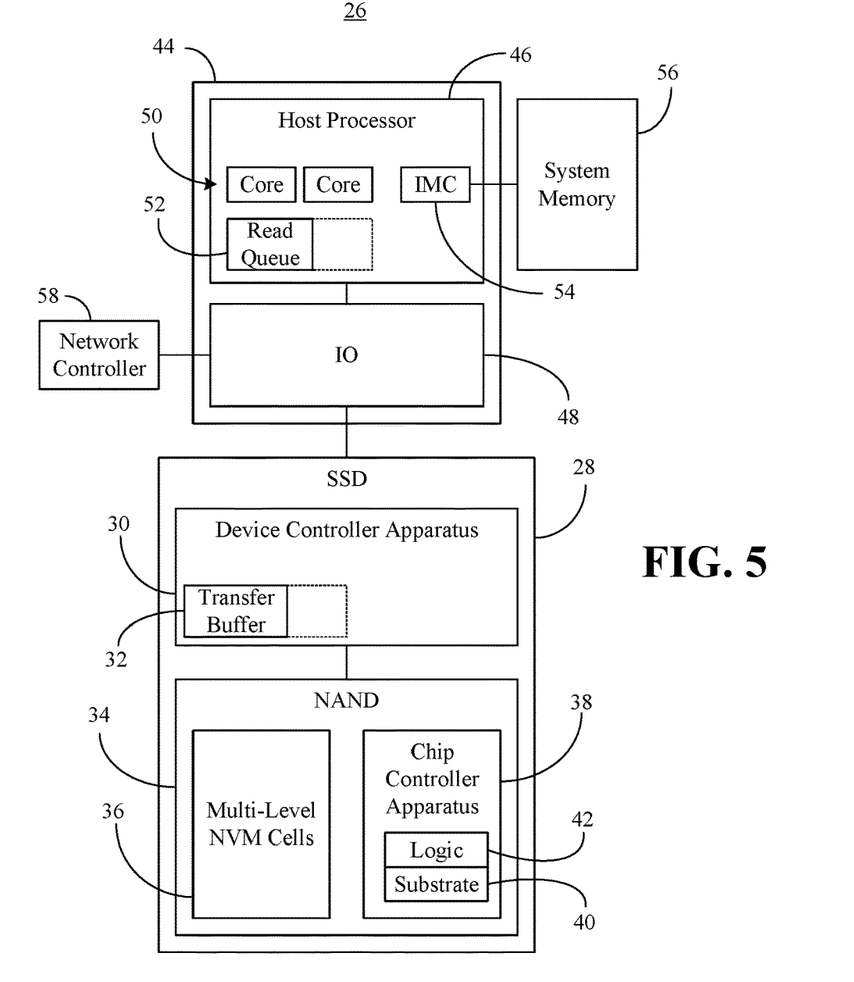
FIG. 5 is another block diagram of an example of a computing system according to an embodiment.
Figure 6:
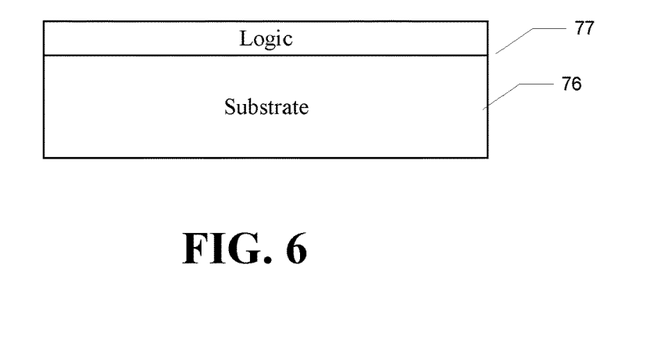
FIG. 6 is an illustration of an example of a semiconductor package apparatus according to an embodiment.

Of course, the NVMe interface is one of many possible interfaces that may be used to read/write data to and from SSD 101 to implement the present invention as recited within the attached claims. The NMVe interface provides an efficient mechanism to implement many uses of the host managed SSD caching solution 100, as example of which is illustrated in FIG. 5 below.

These enhanced read/write operations represent one possible software interface into an SSD device. These enhanced read/write operations are described in reference to FIGS. 2-3 below. Additionally, standard Read, Write, and Dataset Management commands may be used to access the remaining user capacity of the storage device 101 through a separate software interface. Data movement between the HMC region 113 and standard user capacity may be entirely controlled by the host computer 103 via the memory controller 102.

Dynamic write acceleration may divide the storage device 101 into three logical performance regions: a static SLC (SSLC) buffer region 111, a dynamic SLC (DSLC) buffer region 113 and TLC/QLC (XLC) media region 110 corresponding to the HMC region 113. The illustrated SSLC buffer region 111 provides a static buffer for read and write operations into a user data cache for the storage device 101. The DSLC/XLC region 110 may provide the bulk of the storage for the storage device. The two parts of the DSLC/XLC region 110 correspond to memory cells being operated as a single state locations (DSLC) and memory cells operating in a quad state memory locations XLC. Memory cells within the DSLC/XLC region 110 may be converted to operate in either the single state mode or the tri state/quad state mode as erase and write operations occur. Memory cells operating in the DSLC mode typically operate with a faster data transfer read/write rate. Memory cells operating in the XLC mode may store more data.

Incoming user data writes are temporarily staged in the SSLC buffer region 111 before being automatically migrated to the DSLC/XLC region 110. The data migration occurs within the storage device 101 without any commands issued from a host computer. The user accessible capacity of the SSD is comprised of DSLC and XLC capacity.

As an increasing number of user data blocks are used within the storage device 101, DSLC region capacity is converted into XLC capacity, and eventually DSLC is disabled. When the user capacity is completely full, only two logical performance regions remain—SSLC and XLC.

Figure 1B:
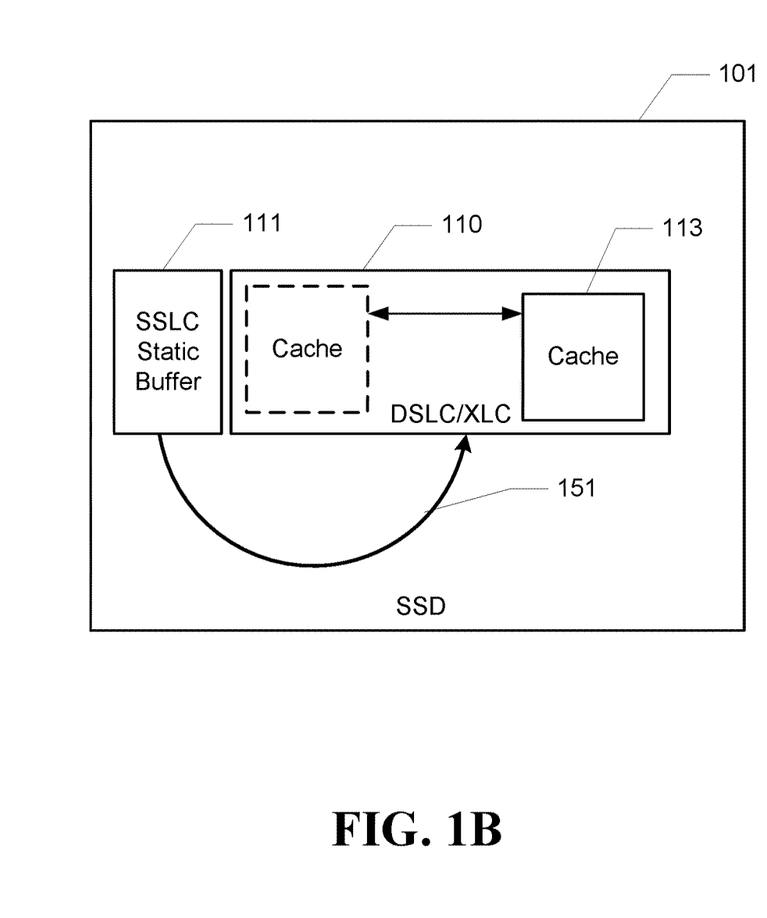

With continuing reference to FIGS. 1A and 1B, a write operation is shown. A data block write operation may be initiated by the host driver 104 to place a block of user data into SSLC buffer region 111. Once complete, host software 103 may continue operating as normal. Shortly thereafter, the storage device 101 migrates the newly written data block 151 to the DSLC/XLC region 110. Host software 103 may also direct the write to be within the host managed cache by utilizing storage locations mapped into the HMC region 113.

The HMC region 113 is physically backed by SLC mode NAND media within the DSLC/XLC 110, and is only accessed via a set of enhanced read/write commands issued by the host driver 104. The HMC region 113 is a virtual subset of the DLSC region 110, and is subject to elimination as DSLC region 110 shrinks beyond a minimum size. The HMC region of the dynamic SLC (DSLC) buffer region 113 has a separate LBA range outside of standard user accessible capacity, similar to a secondary namespace. Unlike SSLC region 111 and DSLC region 110, data in HMC region of the dynamic SLC (DSLC) buffer region 113 must not be automatically migrated to another logical performance region by storage device 101 firmware. All HMC region of the dynamic SLC (DSLC) buffer region 113 data migration is performed by the host software 103 via memory controller 102.

The HMC region of the dynamic SLC (DSLC) buffer region 113 capability is advertised to host software 103 via specific bits in the Identify Controller buffer 121. HMC region of the dynamic SLC (DSLC) buffer region 113 is typically disabled by default, and host software 103 must enable the HMC region of the dynamic SLC (DSLC) buffer region 113 via an enhanced specific set features command. Once the HMC region of the dynamic SLC (DSLC) buffer region 113 is enabled, this region 113 remains enabled until the host software 103 explicitly disables HMC region of the dynamic SLC (DSLC) buffer region 113 by sending an enhanced specific set features command, or an overriding management event occurs e.g. low level format.

A new HMC Log Page 122 is also typically allocated. This log page 122 reports the current HMC region status (enabled/disabled), HMC region capacity (in sectors), and the total available SSD spare capacity (in sectors). Host software 103 may enable Asynchronous Event Notifications for the HMC log page 122. If available, the storage device 101 may complete an HMC Asynchronous Event Request periodically, e.g. after every 1 GB change in the size of spare capacity (increase or decrease).

HMC region of the dynamic SLC (DSLC) buffer region 113 is virtually part of the DSLC performance region 110, and therefore must be compatible with DSLC conversion to XLC capacity. This compatibility is provided via an HMC Asynchronous Event Requests and the HMC Log Page 122. Through a combination of Asynchronous Event Requests and log page polling, the host software 103 may attempt to ensure that the HMC region 113 is disabled before storage device 101 spare capacity is exhausted. Host software 103 cache cleaning policies may progressively become more aggressive as spare capacity nears a minimum. As part of the cleaning process host software 103 may prevent additional application cache writes and/or issue TRIM commands to the HMC range. In a worst case, host software 103 may completely block user traffic to ensure that the HMC region of the dynamic SLC (DSLC) buffer region 113 may be cleaned and disabled before spare capacity is exhausted.

Additionally, host software 103 determines the hotness of data, by using a host driver 104 that employs block cache and file cache techniques as the host driver 104 enjoys access to host DRAM. Host driver's 104 block-cache caches blocks based upon the frequency of access where the host driver 104 puts the data blocks into the cache using second data path 106 when access to those blocks meets certain frequency levels. The host driver 104 removes data blocks from the cache when those frequency levels drop below a set minimum. Additional caching techniques such as ones based upon age of data blocks may also be used. In these embodiments, new data blocks are placed in the cache. As a particular block ages, it may be purged. Some caching software even allows specific data to be "pinned" in the cache so that it is always there. All of these techniques may be used by host software 103 to utilize HMC region of the dynamic SLC (DSLC) buffer region 113.

File-cache typically caches all data for a particular file. This embodiment may implement a hybrid approach where file cache and block cache techniques are used together to achieve optimal performance. As a file cache, host software 103 sees this data as files, stores the files into the SSD using the first data path 105 into the SSLC 111, but promotes and evicts the data in blocks so it can cache smaller blocks of larger files. Both of the block-cache and the file-cache objects may simultaneously reside in the HMC region of the dynamic SLC (DSLC) buffer region 113 as controlled by the device driver 104 of host software 103.

The multi-level NVM cells may be used for a NAND flash memory, three-dimensional (3D) NAND memory array devices, or other memory devices. Non-volatile memory is a storage medium that does not require power to maintain the state of data stored by the medium. In one embodiment, the storage devices 101 is a block addressable memory device, such as those based on NAND or NOR technologies. A memory device may also include future generation non-volatile devices, such as a three dimensional (3D) crosspoint memory device, or other byte addressable write-in-place nonvolatile memory devices. In one embodiment, the memory device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAIVI), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

A multi-level non-volatile memory (NVM) such as, for example, NAND memory may be organized into multiple cells, with each cell containing multiple bits of data. In order to distinguish between the possible bit combinations, various voltage levels may be used. For example, two bits per cell might be programmed and read according to Table I below.

TABLE I

|  | Bit 1 | Bit 2 |
|---|---|---|
| Level 1 (0 mV) | 1 | 1 |
| Level 2 (250 mV) | 0 | 1 |
| Level 3 (500 mV) | 0 | 0 |
| Level 4 (750 mV) | 1 | 0 |

In the above example, a read of Bit 1 may involve determining (e.g., via voltage comparators) whether the corresponding gate in the memory cell conducts at Level 3 (500 mV) and whether the corresponding gate conducts at Level 1 (0 mV). By contrast, a read of Bit 2 may only involve determining whether the corresponding gate in the memory cell conducts at Level 2 (250 mV). The values provided herein are to facilitate discussion only and may vary depending on the circumstances. Due to the multiple determinations associated with Bit 1, reading Bit 1 may generally take twice as long as reading Bit 2. As the number of bits per cell increases (e.g., to tri-level cell/TLC architectures, quad level cell/QLC architectures, etc.), the read time inconsistency may present a number of challenges with respect to garbage collection, multi-threaded operation, and so forth. As will be discussed in greater detail, an enhanced encoding scheme may be used to achieve consistent read times in multi-level NVM structures.

FIG. 2 is a flowchart of an example of a method 200 of conducting a write operation according to an embodiment. The processing starts 201 and block 211 issues an application write command to store a block of data into a storage device such as, for example, the storage device 101 (FIG. 1A). The file system of a host computer such as, for example, the host computer 102 (FIG. 1A) may register the write command in block 212, wherein and the host driver receives the write command for processing in block 213.

With continuing reference to FIGS. 1A, 1B and 2, decision block 214 determines whether the data block to be written is to be stored within the HMC region 113. If not, block 216 performs a standard write operation into SSLC region 111 before the process ends. As discussed above, the data block will migrate from the SSLC region 111 to the DSLC/XLC region 110 under control of the storage device 101.

If block 214 determines that the data block to be written is to be stored within the HMC region 113, processing block 215 translates the data block write location into its location in the HMC region of the dynamic SLC (DSLC) buffer region 113 space. Using the translated address into the HMC region 113 space, the data block may be written into HMC region of the dynamic SLC (DSLC) buffer region 113. As noted above, the HMC cache data may be pinned into the HMC region of the dynamic SLC (DSLC) buffer region 113 to ensure its faster access by host driver 104.

As data blocks accumulate within storage device 101, the device 101 may also migrate data blocks 222 from single level state cells to multi-level cells before converting the single level cell into a multi-level cell.

FIG. 3 is a flowchart of an example read operation according to an embodiment. The processing starts 301 and block 311 issues an application read command to store a block of data from storage device 101. The file system of host computer 102 registers the read command in block 312 and host driver 104 receives the read command for processing in block 313.

Decision block 314 determines whether the data block to be read is located within the HMC region of the dynamic SLC (DSLC) buffer region 113. If not, block 316 performs a standard read operation into before the process ends.

If block 314 determines that the data block to be read is located within the HMC region of the dynamic SLC (DSLC) buffer region 113, processing block 315 translates the data block read location into its location in the HMC region of the dynamic SLC (DSLC) buffer region 113 space. Using the translated address into the HMC region 113 space, the data block may be read from HMC region of the dynamic SLC (DSLC) buffer region 113. As noted above, the HMC cache data may be pinned into a particular location within the storage device 101.

FIGS. 2-3 show a write method 200 and a read method 300 of operating computing system to utilize a host managed SSD caching using dynamic write acceleration. The method 200 and method 300 may generally be implemented in a computing system or a memory controller such as, for example, the memory controller 102 (FIG. 1), already discussed. More particularly, the method 200 and method 300 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in methods 200, 300 may be written in any combination of one or more programming languages, including an object-oriented programming language such as Java, Smalltalk, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
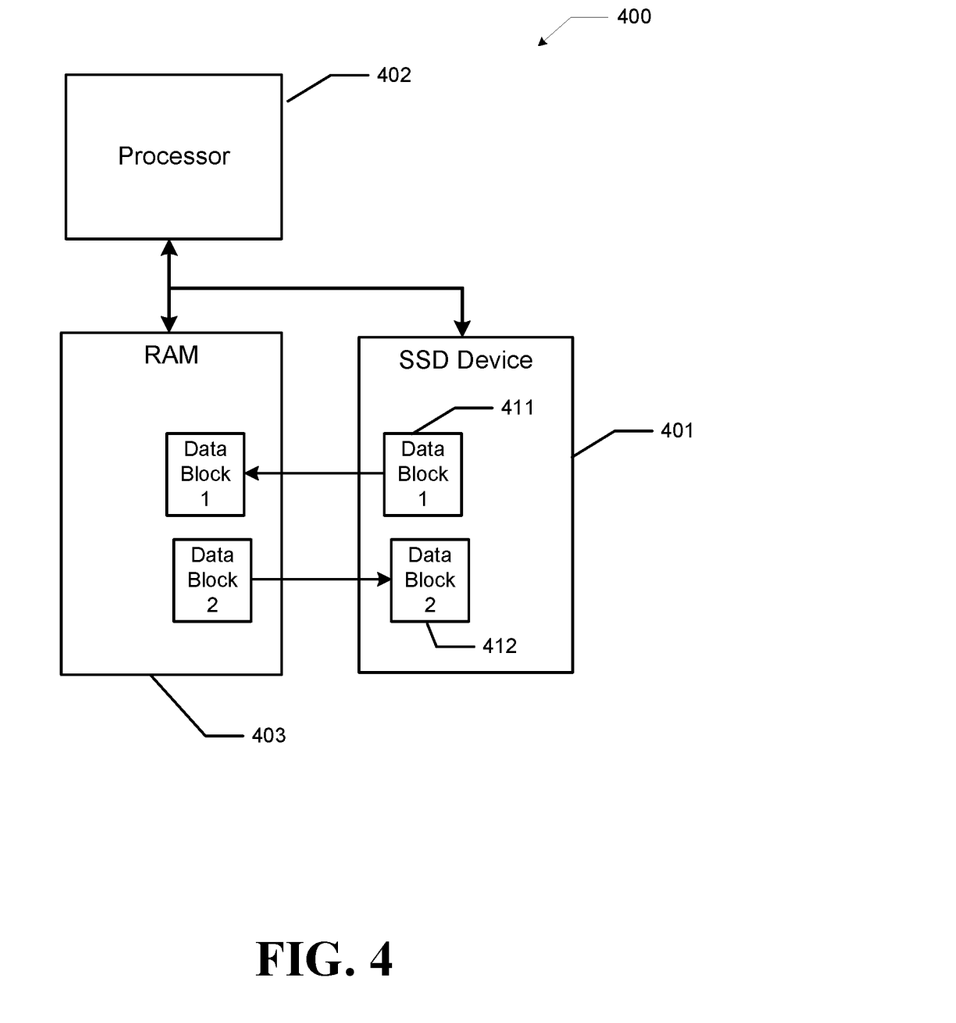
FIG. 4 is a block diagram of an example of a computing system according to an embodiment.

FIG. 4 illustrates an example embodiment for a computing system 400 that utilizes an SSD device with dynamic write acceleration. The SSD device 401 is located within a computing system coupled to a processor 402 and random access memory (RAM) 403. In this embodiment, an address space of the RAM 403 is logically divided into blocks of data, which may be references as memory pages. In many computing systems, the amount of RAM 403 present in the computing system 400 is less than the total amount of memory that may be addressed by the processor 402. When the amount of data to be addressed by the processor exceeds the amount of RAM 403 in the computing system 400, blocks of data are stored as pages in mass storage devices such as SSD device 401. Typically, host software 103 running within the processor 402 keeps data currently being accessed in RAM 403 and allows data not currently being used to be off-loaded into SSD device 401. When the processor 402 attempts to access data within a block of data stored within SSD device 401, the particular block of data, data block 1 411, is loaded into RAM 403 in place of a block of data, data block 2 412, that is offloaded to SSD device 401.

Various caching mechanisms may be used to determine which of the data blocks in RAM 403 is to be offloaded to the SSD device 401 to make space available for the data currently being accessed by processor 402. These caching mechanisms may evict a block of data that corresponds to a block having the longest amount of time since last being accessed. These caching mechanisms may also utilize a count of the frequency of times a block has been accessed over a prior period of time to select the block to evict. All of these mechanisms are attempting to remove the block of data that is likely to not be accessed in the immediate future. Of course, other mechanisms for determining the data block eviction strategy may be used.

Because the amount of time needed to access data stored within the SSD device 401 is typically greater than the time needed to access data stored within RAM 403, system performance may be affected by the access time of data within the SSD device 401. An SSD device that utilizes the dynamic acceleration disclosed herein provides a mechanism to speed up the access time to SSD device 401 for data stored within dynamic SLC (DSLC) buffer region 113 as compared to data accessed using the static SLC (SSLC) buffer region 111. Host software 103 may determine if a data blocked stored within SSD device 401 is likely to be accessed in the future using one of the caching mechanism discussed above. These selected blocks of data may be stored within the DSLC buffer region 113 to provide faster access than data blocks stored within SSLC. buffer region 111.

As noted above, the SSLC buffer region 111 permits more data to be stored within a memory cell, the dynamic write acceleration commands provide a mechanism to convert memory cells to and from single bit cells and multi-bit cells to provide an amount of data storage needed to hold all of the blocks of data that cannot be located within the available RAM 403. Host software 103 may control the amount of memory cells to be used as either single bit cells or multi-bit cells as needed. As noted above, when the amount of memory available as single bit cells falls below a predefined threshold value, the SSD device 401 in conjunction with host software 103 may disable the enhanced set of read/write commands to provide the maximum amount of data storage for cached memory pages. Host software 103 may control which blocks of data are to be always stored within the DSLC buffer region 113 to maintain a level of system performance and/or whether the DSLC buffer region 113 is to be disabled if the number of data blocks to be paged grows large. System performance may be optimized by attempting to use the number of single bit memory cells as compared to the multi-bit memory cells when the difference in the data access times is considered. Host software 103 may utilize any optimization protocol needed for a given processing application and processing environment.

Turning now to FIG. 5, a consistency-enhanced computing system 26 is shown. In the illustrated example, a solid-state drive (SSD) 28 includes a device controller apparatus 30 having a transfer buffer 32 that is used to store garbage collection data during the transfer of the data between different locations in a NAND 34. The illustrated NAND 34 includes a set of multi-level NVM cells 36 and a chip controller apparatus 38 that includes a substrate 40 (e.g., silicon, sapphire, gallium arsenide) and logic 42 (e.g., transistor array and other integrated circuit/IC components) coupled to the substrate 40. The logic 42, which may include fixed-functionality hardware, may be configured to perform one or more aspects of the method 14 (FIG. 2), already discussed.

More particularly, the logic 42 may read a lower page, one or more intermediate pages and/or a last page from the set of multi-level NVM cells 36, wherein one or more of a read time associated with the lower page or a last read time associated with the last page is to be substantially similar to an intermediate read time associated with the one or more intermediate pages. Accordingly, the garbage collection activities of the device controller apparatus 30 may require less space in the transfer buffer 32.

In general, the levels mentioned above may be set during programming of the NAND cell. In one example, one bit is programmed at a time to retain the traditional hard disk like behavior for SSDs. Additionally, all four bits (for QLC) of information may be passed to the NAND 34 per program operation. As a consequence, increased buffering may be involved inside the SSD 28 prior to issuing the program command to the NAND 34. A side effect of finely programming each voltage level within a tight distribution may also be increased buffering inside the SSD 28 (due to longer program time/$T_{prog}$), which is unrelated to the encoding scheme(s) described herein. Since the tight distribution used per level may increase the buffering inside the SSD 28, leading to DRAM based data buffering in addition to the transfer buffer 32, the technology described herein may "piggy back" on the same scheme with a modest increase to the DRAM buffer size. Commercially available DRAM used in SSDs may come in 100s of Megabytes, whereas the increased DRAM buffer size may be on the order of 10s of MBs (i.e., not a cost adder for data center SSD configurations that employ DRAM anyway and often have unused DRAM capacity).

The illustrated system 26 also includes a system on chip (SoC) 44 having a host processor 46 (e.g., central processing unit/CPU) and an input/output (TO) module 48. The host processor 46 may include a plurality of cores 50, a read queue 52 and an integrated memory controller 54 (IMC) that communicates with system memory 56. The illustrated IO module 48 is coupled to the SSD 28 as well as other system components such as a network controller 58. In one example, the host processor 46 is agnostic to the encoding scheme used by the chip controller apparatus 38.

As already noted, the average read times may be the same for all encoding schemes. The read bandwidth varies depending on the duration of the read time ($T_{read}$). Software applications running on the host processor 46 may have fewer threads—e.g., no more than the number of cores 50 available—to minimize the overhead of thread context switches. The technology described herein may enable host interface bandwidth saturation to be achieved for read operations with fewer threads at the host level, resulting in much better performance at the application level. In addition, because data center applications may size resources for the slowest $T_{read}$, the technology described herein may reduce the host resources required as the worst case $T_{read}$ may be half of the traditional encoding scheme.

FIG. 5 shows a semiconductor package apparatus 75 (e.g., chip) that includes a substrate 76 (e.g., silicon, sapphire, gallium arsenide) and logic 77 (e.g., transistor array and other integrated circuit/IC components) coupled to the substrate 76. The logic 77, which may be implemented at least partly in configurable logic and/or fixed-functionality logic hardware, may generally implement one or more aspects of the method 200 (FIG. 2) and/or the method 300 (FIG. 3), already discussed, whether the method is performed within chip controller apparatus 38, device controller apparatus 30, and SoC 44.

ADDITIONAL NOTES AND EXAMPLES

Example 1 may include a solid state drive system comprising a host computer apparatus including a transfer buffer and a non-volatile memory (NVM) communicatively coupled to the device controller apparatus. The NVM including a set of multi-level NVM cells organized into a dynamic single level cell buffer region corresponding to a host managed cache region, a static single level cell buffer region, and a dynamic multi-level NVM media region, and a chip controller apparatus that includes a substrate and logic coupled to the substrate. The logic is implemented in one or more of configurable logic or fixed-functionality hardware logic, the logic coupled to the substrate to write a block of data addressed within the host managed cache region into the dynamic single cell buffer region, write a block of data addressed within the fast NVM region into the dynamic single cell buffer region under the control of host computer, to write a block of data addressed outside the fast NVM region into the static single level cell buffer region, and to automatically write the contents of the static single level cell buffer region into the dynamic multi-level NVM media region. The fast NVM region comprises a set of dynamic single level NVM cells within the dynamic multi-level NVM media region addressable under the control of the host computer, and the multi-level NVM cells are dynamically convertible into and from single NVM cells.

Example 2 may include the system of Example 1, the host computer apparatus receives write requests for blocks of data and determine whether the blocks of data are to be stored within the fast NVM region.

Example 3 may include the system of any one of Examples 1 to 2, wherein the fast NVM region comprises single level NVM cells.

Example 4 may include the system of Example 2, the unused multi-level NVM cells are to be converted to single level NVM cells based upon the number of times data has been written into the cells.

Example 5 may include the system of Example 1, the fast NVM region is to utilize an oldest cache block removal policy.

Example 6 may include the system of Example 1, the fast NVM region is accessed using vendor specific commands.

Example 7 may include the system of Example 1, the set of multi-level NVM cells includes a quad level cell architecture.

Example 8 may include the system of Example 1, the set of multi-level NVM cells includes a tri-level cell architecture.

Example 9 may include the system of Example 1, the dynamic single level cell buffer region of the fast NVM region on is to be disabled and all write operations are to be into the static single level cell buffer region when the number of unused cells within the dynamic multi-level NVM media region is below a predetermined threshold.

Example 10 may include a semiconductor package apparatus comprising a substrate logic coupled to the substrate, The logic is implemented in one or more of configurable logic or fixed-functionality hardware logic, the logic coupled to the substrate to write a block of data addressed within the host managed cache region into the dynamic single cell buffer region, write a block of data addressed within the fast NVM region into the dynamic single cell buffer region under the control of host computer, to write a block of data addressed outside the fast NVM region into the static single level cell buffer region, and to automatically write the contents of the static single level cell buffer region into the dynamic multi-level NVM media region. The fast NVM region comprises a set of dynamic single level NVM cells within the dynamic multi-level NVM media region addressable under the control of the host computer, and the multi-level NVM cells are dynamically convertible into and from single NVM cells.

Example 11 may include the apparatus of Example 10, the logic is to further receive write requests for blocks of data and determine whether the blocks of data are to be stored within the fast NVM region.

Example 12 may include the apparatus of any one of Examples 10 to 11, the logic further dynamically convert unused multi-level NVM cells within the dynamic multi-level NVM media region to single level NVM cells for use in the fast NVM region.

Example 13 may include the apparatus of Example 12, the unused multi-level NVM cells are to be converted to single level NVM cells based upon the number of times data has been written into the cells.

Example 14 may include the apparatus of Example 13, the fast NVM region is accessed using vendor specific commands.

Example 15 may include the apparatus of Example 13, the fast NVM region is to utilize a least frequency read cache block removal policy.

Example 16 may include the apparatus of Example 10, the set of multi-level NVM cells includes a quad level cell architecture.

Example 17 may include the apparatus of Example 10, the set of multi-level NVM cells includes a tri-level cell architecture.

Example 18 may include the apparatus of Example 10, the dynamic single level cell buffer region of the fast NVM region is to be disabled and all write operations are to be into the static single level cell buffer region when the number of unused cells within the dynamic multi-level NVM media region is below a predetermined threshold.

Example 19 may include a method of operating a solid state drive. The method writes a block of data addressed within a host managed cache region into a set of multi-level NVM cells organized into a dynamic single level cell buffer region, writes a block of data addressed outside the fast NVM region into the set of multi-level NVM cells organized into a static single level cell buffer region, and automatically writes the contents of the static single level cell buffer region into the dynamic multi-level NVM media region. The fast NVM region is to comprise a set of dynamic single level NVM cells within the dynamic multi-level NVM media region and the multi-level NVM cells are to be dynamically convertible into and from single NVM cells.

Example 20 may include the method of Example 19, the method further dynamically converts unused multi-level NVM cells within the dynamic multi-level NVM media region to single level NVM cells for use in the fast NVM region.

Example 21 may include the system of Example 19, the fast NVM region is accessed using vendor specific commands.

Example 22 may include the method of Example 19, the fast NVM region is to utilize a least frequency read cache block removal policy.

Example 23 may include the method of Example 19, the set of multi-level NVM cells includes a quad level cell architecture.

Example 24 may include the method of Example 19, the set of multi-level NVM cells includes a tri-level cell architecture.

Example 25 may include a solid state drive system comprising a means for writing a block of data addressed within a fast NVM region into a set of multi-level NVM cells organized into a dynamic single level cell buffer region, a means for writing a block of data addressed outside the fast NVM region region into the set of multi-level NVM cells organized into a static single level cell buffer region, and a means for automatically writing the contents of the static single level cell buffer region into the dynamic multi-level NVM media region. The fast NVM region is to comprise a set of dynamic single level NVM cells within the dynamic multi-level NVM media region and the multi-level NVM cells are to be dynamically convertible into and from single NVM cells.

Example 26 may include the system of Example 19, the method further dynamically converts unused multi-level NVM cells within the dynamic multi-level NVM media region to single level NVM cells for use in the fast NVM region.

Example 27 may include the system of Example 19, the fast NVM region is to utilize an oldest cache block removal policy.

Example 28 may include the system of Example 19, the fast NVM region is to utilize a least frequency read cache block removal policy.

Example 29 may include the system of Example 19, the set of multi-level NVM cells includes a quad level cell architecture.

Example 30 may include the system of Example 19, the set of multi-level NVM cells includes a tri-level cell architecture.

Technology described herein may therefore map target read times to voltage level bins available in multi-bits per cell such that it takes approximately the same amount of time to read a bit in the cell regardless of how many bits per cell are present. The technology may also create features in NAND memory that are optimized for SSD usage. For example, the NAND memory may have an encoding scheme that delivers better consistency and uniformity of IO operations. Additionally, reducing the size of the comparison circuitry may lead to significant space savings due to the ability to position the comparison circuitry under the NAND cell array in a three-dimensional (3D) architecture (e.g., CMOS under array/CUA). Moreover, since uniformity of write TO operations per second (TOPS) may be dominated by the rate at which garbage collection is reclaiming free space inside the SSD, the technology described herein may deliver better write uniformity with lower cost. Indeed, having consistent read times may help size resources across the operating system (OS) stack, which may be particularly beneficial to data center/enterprise use cases in which data updates are frequent and less predictable.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a non-volatile memory (NVM) communicatively coupled to a host computer apparatus, the NVM including a set of multi-level NVM cells organized into a dynamic single level cell buffer region corresponding to a fast NVM region, a static single level cell buffer region, and a dynamic multi-level NVM media region, and a chip controller apparatus that includes a substrate and logic coupled to the substrate, wherein the logic is implemented in one or more of configurable logic or fixed-functionality hardware logic, the logic coupled to the substrate to:
write a block of data addressed within the fast NVM region into the dynamic single cell buffer region under the control of the host computer;
write a block of data addressed outside the fast NVM region into the static single level cell buffer region; and
automatically write the contents of the static single level cell buffer region into the dynamic multi-level NVM media region;
wherein the fast NVM region comprises a set of dynamic single level NVM cells within the dynamic multi-level NVM media region addressable under the control of the host computer, and
wherein the multi-level NVM cells are dynamically convertible into and from single NVM cells.

2. The system of claim 1, wherein the host computer apparatus is to receive write requests for blocks of data and determine whether the blocks of data are to be stored within the fast NVM region.

3. The system of claim 1, wherein the fast NVM region comprises single level NVM cells.

4. The system of claim 3, wherein the unused multi-level NVM cells are to be converted to single level NVM cells based upon the number of times data has been written into the cells.

5. The system of claim 4, wherein the fast NVM region is to utilize an oldest cache block removal policy.

6. The system of claim 4, wherein the fast NVM region is accessed using vendor specific commands.

7. The system of claim 1, wherein the set of multi-level NVM cells includes a quad level cell architecture.

8. The system of claim 1, wherein the set of multi-level NVM cells includes a tri-level cell architecture.

9. The system of claim 1, wherein the dynamic single level cell buffer region of the fast NVM region is to be disabled and all write operations are to be into the static single level cell buffer region when the number of unused cells within the dynamic multi-level NVM media region is below a predetermined threshold.

10. An apparatus comprising:
a substrate; and
logic coupled to the substrate, wherein the logic is implemented in one or more of configurable logic or fixed-functionality hardware logic, the logic coupled to the substrate to:
write a block of data addressed within a fast NVM region into a dynamic single cell buffer region under the control of a host computer;
write a block of data addressed outside the fast NVM region into a static single level cell buffer region; and
automatically write the contents of the static single level cell buffer region into a dynamic multi-level NVM media region;
wherein the fast NVM region comprises a set of dynamic single level NVM cells within the dynamic multi-level NVM media region addressable under the control of the host computer, and
wherein the multi-level NVM cells are dynamically convertible into and from single NVM cells.

11. The apparatus of claim 10, wherein the fast NVM region comprises single level NVM cells.

12. The apparatus of claim 10, wherein the logic is to further receive write requests for blocks of data and determine whether the blocks of data are to be stored within the fast NVM region.

13. The apparatus of claim 11, wherein the unused multi-level NVM cells are to be converted to single level NVM cells based upon the number of times data has been written into the cells.

14. The apparatus of claim 13, wherein the fast NVM region is accessed using vendor specific commands.

15. The apparatus of claim 13, wherein the fast NVM region is to utilize a least frequently read cache block removal policy.

16. The apparatus of claim 10, wherein the set of multi-level NVM cells is to include a quad level cell architecture.

17. The apparatus of claim 10, wherein the set of multi-level NVM cells is to include a tri-level cell architecture.

18. The apparatus of claim 10, wherein the dynamic single level cell buffer region of the fast NVM region is disabled and all write operations are into the static single level cell buffer region when the number of unused cells within the dynamic multi-level NVM media region is below a predetermined threshold.

19. A method comprising:
writing a block of data addressed within a fast NVM region into a set of multi-level NVM cells organized into a dynamic single level cell buffer region under the control of a host computer;
writing a block of data addressed outside the fast NVM region into the set of multi-level NVM cells organized into a static single level cell buffer region; and
automatically writing the contents of the static single level cell buffer region into a dynamic multi-level NVM media region;
wherein the fast NVM region comprises a set of dynamic single level NVM cells within the dynamic multi-level NVM media region addressable under the control of the host computer, and
wherein the multi-level NVM cells are dynamically convertible into and from single NVM cells.

20. The method of claim 19, wherein the fast NVM region comprises single level NVM cells.

21. The method of claim 19, wherein the fast NVM region is accessed using vendor specific commands.

22. The method of claim 19, wherein the fast NVM region utilizes a least frequently read cache block removal policy.

23. The method of claim 19, wherein the set of multi-level NVM cells includes a quad level cell architecture.

24. The method of claim 19, wherein the set of multi-level NVM cells includes a tri-level cell architecture.

* * * * *